Nov. 20, 1951  C. H. JORGENSEN ET AL  2,575,345
ENGINE CONTROLLER

Original Filed April 17, 1943  9 Sheets-Sheet 1

Inventors
Clarence H. Jorgensen
and William H. Taylor
by Spencer Hardman & Fehr
their attorneys

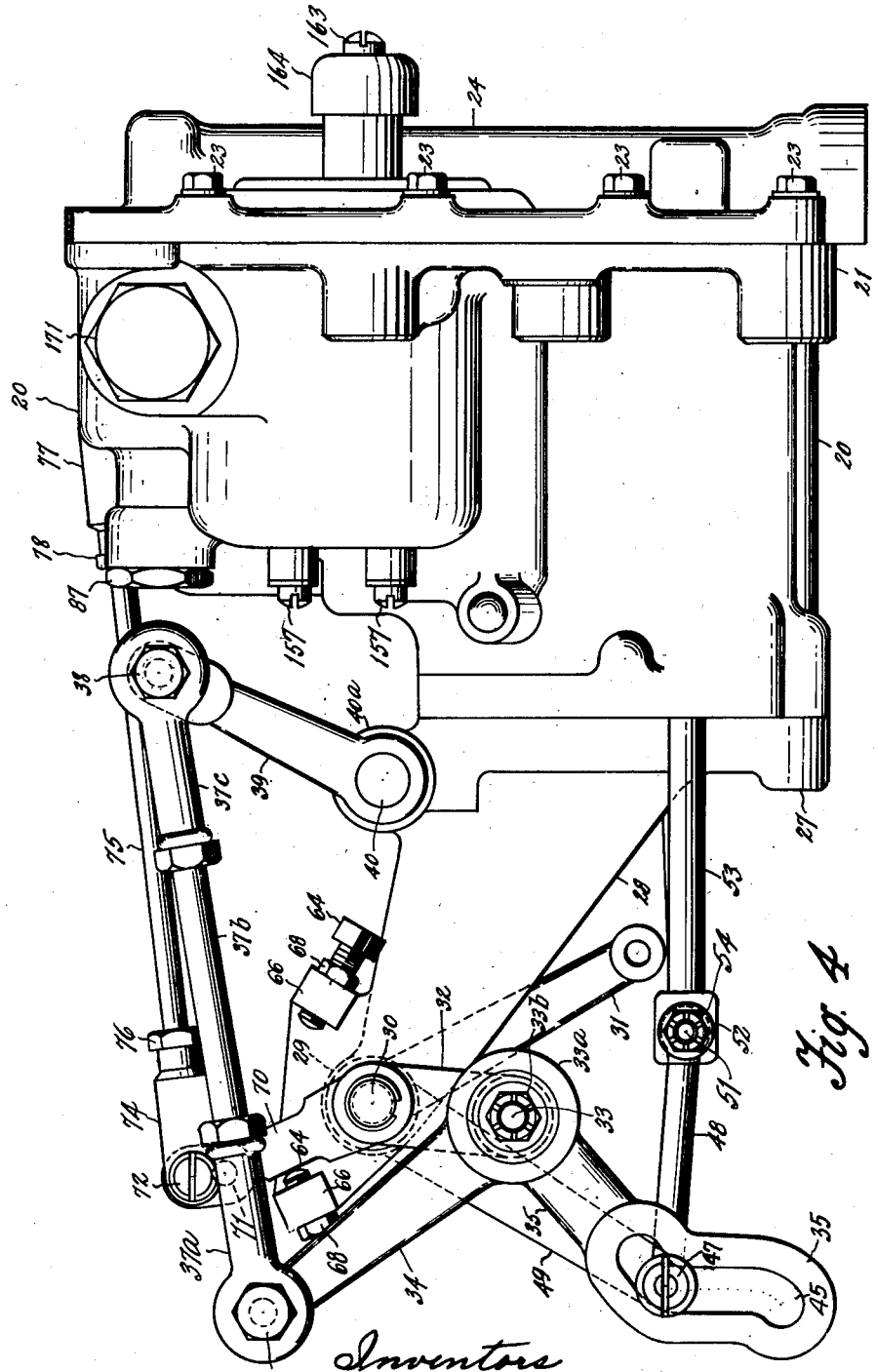

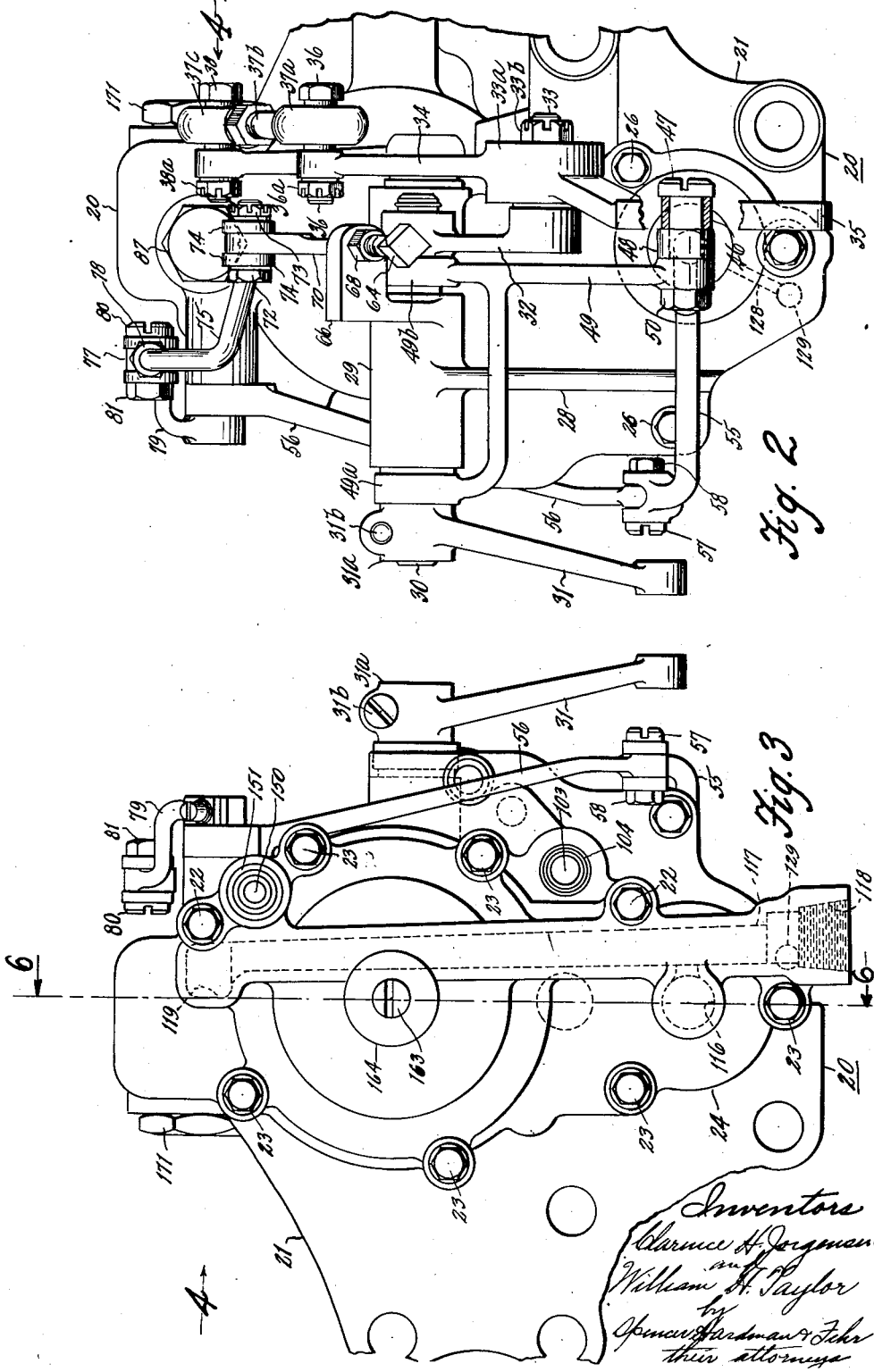

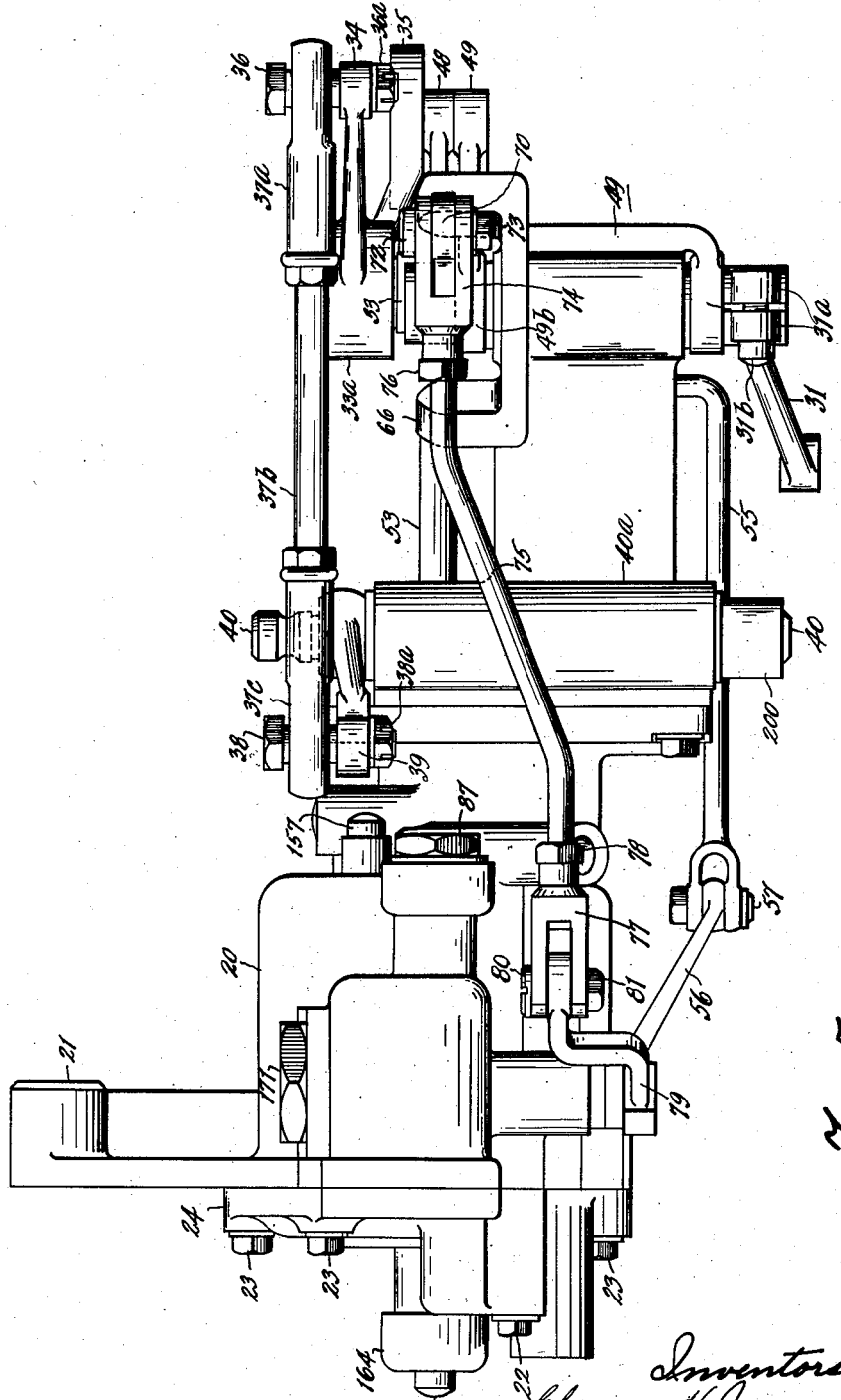

Nov. 20, 1951   C. H. JORGENSEN ET AL   2,575,345
ENGINE CONTROLLER
Original Filed April 17, 1943   9 Sheets-Sheet 5
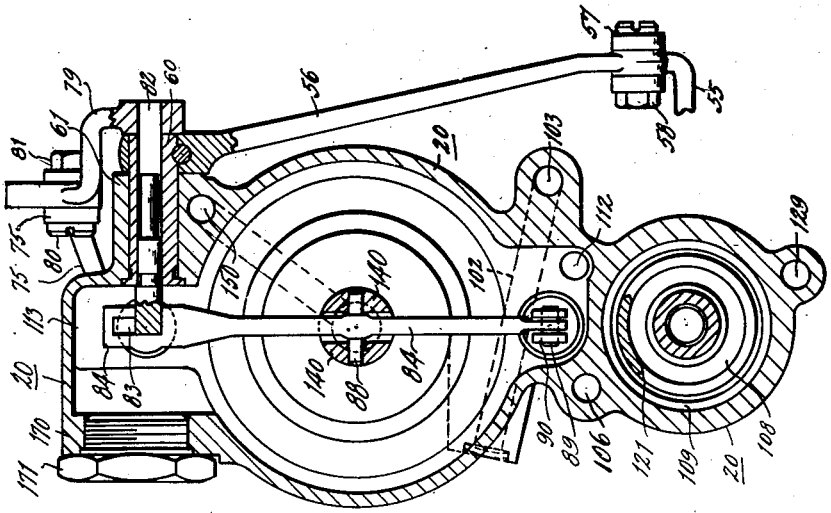
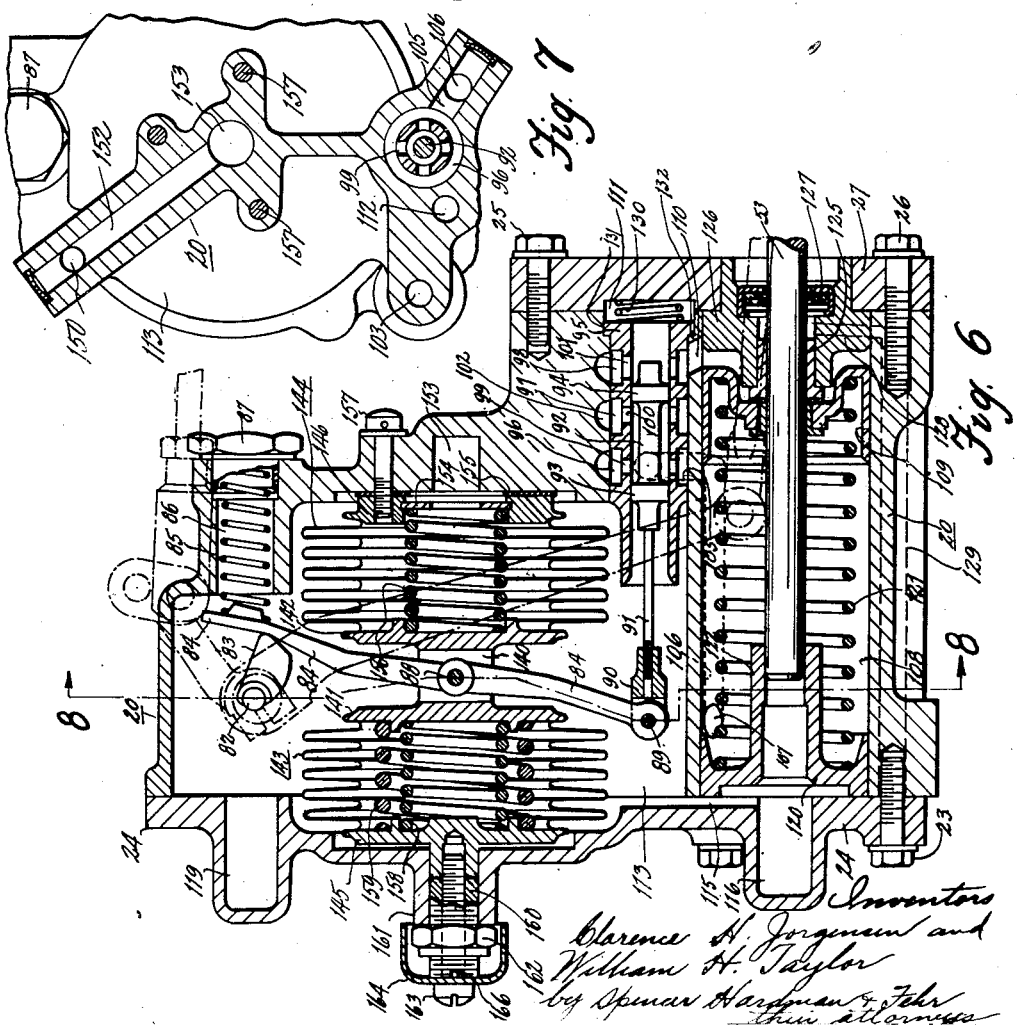

Patented Nov. 20, 1951

2,575,345

UNITED STATES PATENT OFFICE 2,575,345

ENGINE CONTROLLER

Clarence H. Jorgensen, Rochester, N. Y., and William H. Taylor, Anderson, Ind., assignors to General Motors Corporation, Detroit, Mich., a corporation of Delaware Continuation of application Serial No. 483,438, April 17, 1943. This application August 24, 1945, Serial No. 612,392

24 Claims. (Cl. 123—103)

This invention relates to fuel intake pressure controllers for supercharged internal combustion engines used on airplanes. A type of pressure controller to which the present invention relates is disclosed in Dolza et al. application Serial No. 449,918, filed July 6, 1942, and now forfeited. The controller of the Dolza application has a main control lever connected with the pilot's throttle control lever. The main control lever is manually operated to effect a certain amount of throttle opening approximating the opening required for take-off. The manually effected throttle opening is supplemented by automatically effected throttle opening to whatever position is required to maintain a predetermined fuel intake pressure with changing altitude. The automatic control of the throttle is effected by an hydraulic servo-motor having a control valve which is initially set by the manually operated main control lever for the purpose of selecting the fuel intake pressure to be maintained in predetermined relation to altitude and which is adjusted by means responsive to fuel intake pressure in order that the servo-motor will operate to the extent required for automatically moving the throttle valve to obtain the fuel intake pressure required to be maintained at a particular altitude.

The extent of throttle opening obtained manually, plus the extent of throttle opening obtained automatically, gives wide open throttle position at critical altitude for a limited range of selection of high intake pressure such as required for take-off and emergency operation of the engine. For the range of pressure selections used in cruising, the throttle opening is less than wide open.

For some makes of engine, the full opening of the throttle is not demanded for cruising purposes. However, there are other engine makers who demand that the regulator shall give wide open throttle at critical altitude, not only when the pressure selection is at high values specified for take-off and emergency, but also when the pressure selection is at lower values specified for cruising.

It is, therefore, an object of the present invention to provide a throttle valve controller so constructed and arranged as to provide a manual control of the throttle supplemented by an automatic control such that the total amount of throttle movement effected manually and automatically brings the throttle to wide open position at critical altitude throughout a range of pressure selections extending from the high pressures specified for take-off and emergency to substantially lower pressures specified for cruising.

In the disclosed embodiment of the present invention this object is accomplished by a variable connection between the servomotor and one arm of a floating lever whose other arm is connected with the throttle. The fulcrum of the floating lever is moved by the main control lever which selects pressures to be maintained in relation to altitude. The manual movement of the floating lever causes manual movement of the throttle to a partly open position, and the preconditioning of the variable connection between the floating lever and the servomotor in a manner such that when critical altitude is reached, the throttle will be moved to wide open position by the servomotor whether the selected pressure is high as required for take-off, or emergency, or lower, as specified for cruising.

This application is a continuation of application Serial No. 483,438, filed April 17, 1943, and now forfeited.

Further objects and advantages of the present invention will be apparent from the following description, reference being had to the accompanying drawings wherein a preferred embodiment of the present invention is clearly shown.

In the drawings:

Fig. 2 is an end view taken in the direction of arrow 2 of Fig. 1.

Fig. 3 is an end view taken in the direction of the arrow 3 of Fig. 1.

Fig. 4 is a side elevation taken in the direction of the arrow 4 of Fig. 2 and arrow 4 of Fig. 3.

Fig. 5 is a top view taken in the direction of the arrow 5 of Fig. 1.

Fig. 6 is a fragmentary sectional view on line 6—6 of Fig. 3.

Fig. 7 is a fragmentary sectional view on line 7—7 of Fig. 1.

Fig. 8 is a sectional view on line 8—8 of Fig. 6.

Figure 1:
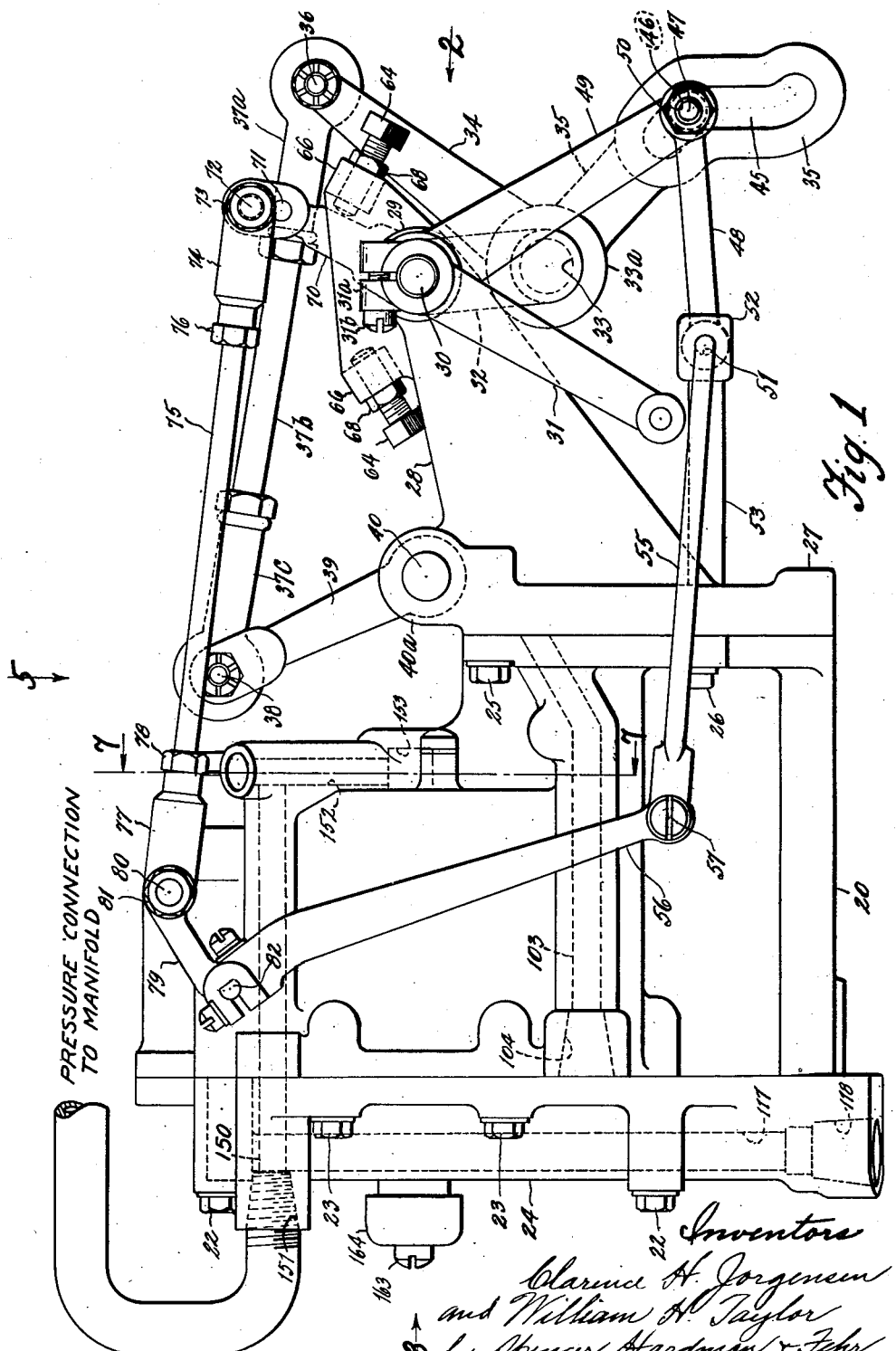
Fig. 1 is a side elevation of a fuel intake pressure controller embodying the present invention.
Figure 9:
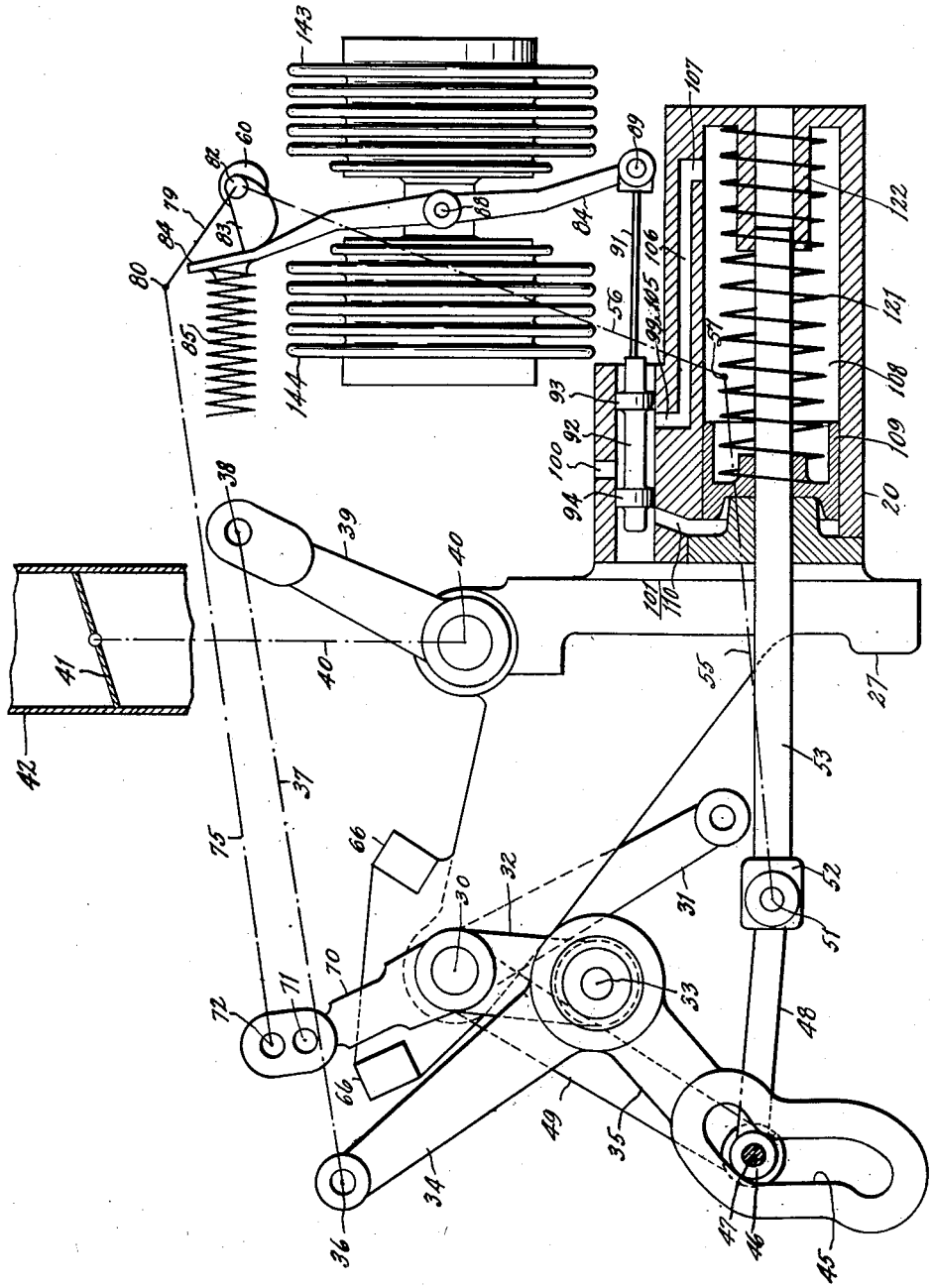
Fig. 9 is a diagrammatic side elevation viewed from the same side as Fig. 4 and showing the controller in condition for placing the throttle valve in idle position.

Referring to Fig. 1, the controller comprises a housing 20 having an integral bracket 21 (Figs. 3 and 5) by which the controller may be mounted on the frame of an internal combustion engine. Screws 22 and 23 secure to the housing 20 a plate 24. Screws 25 and 26 secure to the housing 20 a plate 27. Plate 27 provides a bracket 28 supporting a bearing 29 (Fig. 2). Bearing 29 supports a shaft 30 which is operated by a main control lever 31 connected by any suitable means with the pilot's throttle control lever (not shown). The pilot's control lever is provided with means for frictionally retaining it in the position set by the pilot; therefore, control lever 31 remains in the position in which it is set by the pilot. When shaft 30 is turned by the arm 31, it moves an arm 32 carrying at its free end a stud 33 which provides a movable fulcrum for a bell crank lever having arms 34 and 35. The free end of arm 34 is connected at 36 with a link comprising parts 37a, 37b and 37c which is connected at 38 with a lever 39 attached to a shaft 40, which, as shown diagrammatically in Fig. 9, is connected with the throttle valve 41 of an engine fuel intake duct 42. Arm 35 of the bell crank lever is provided with the cam slot 45 receiving a roller 46 (Fig. 2) supported by a screw stud 47 passing through a plain hole in an end of a link 48 through a tapped hole in the end of an arm 49 and threadedly engaged by a nut 50. Arm 49 is integral with two hubs 49a and 49b which are supported by the shaft 30, but are not driven thereby. Cam 45 provides a variable connection between lever 35 and an hydraulic servo-motor.

The link 48 is pivotally connected by a stud 51 with a block 52 threaded on the end of a piston rod 53 of an hydraulic servo-motor to be described. Nut 54 retains the stud 51 in position. The stud 51 is integral with a rod 55 providing a link which connects the block 52 with an arm 56 through a pivot screw 57 retained by a nut 58 (Fig. 3). Arm 56 is connected with a shaft 60 journalled in a bearing 61 provided by housing 20 (Fig. 8).

The main control lever 31 is secured to the shaft 30 in various positions depending upon the manner of connecting the lever with the pilot's control lever. This is effected by providing the lever 31 with a clamping hub 31a cooperating with clamping screw 31b. The limits of movement of lever 31 are set by stop screws 64 threaded through lugs 66, respectively integral with bracket 28 and locked into adjusted position by nuts 68. The stop screws 64 engage a lever 70 integral with the lever 32 and provided with one or more holes 71 near its free end. One of the holes 71 may be selected for passing therethrough a screw 72 secured by nut 73 and providing a pivotal connection with a clevis 74, threadedly connected with a rod 75 and locked thereto in adjusted position by nut 76. Rod 75 is threadedly connected with the clevis 77 which is locked thereto in adjusted position by a nut 78. Clevis 77 is pivotally connected with an arm 79 by a screw pin 80 retained by nut 81. Arm 79 is connected with shaft 82 (Figs. 1 and 8) having a bearing in the shaft 60 eccentric with respect to the axis of shaft 60.

Shaft 82 supports and drives a cam 83 (Fig. 6) for selecting pressure to be maintained in a predetermined relation to altitude in the fuel intake passage 42 (Fig. 9) of the engine. Cam 83 engages a lever 84 urged against the cam by a spring 85 located in a pocket 86 of housing 20 and retained by a plug 87. Intermediate its ends, the lever 84 is pivotally supported by pin 88 and is attached at its lower end by pin 89 to a clevis 90, attached by rod 91 to a valve 92, having lands 93 and 94 and slidable within a valve sleeve 95 having annular grooves 96, 97 and 98 communicating, respectively, with the interior of said sleeve by ports 99, 100 and 101. There are four each of the ports 99, 100 and 101, as indicated in Fig. 7.

The ports 100 are the high pressure inlet ports and are connected by passage 102 with a passage 103 which, as shown in Fig. 1, communicates with an opening 104 for receiving the threaded pipe (not shown) by which a connection is made at the oil pressure system of the engine. As shown in Fig. 6, ports 99 are connected with ports 100, therefore, pressure oil will flow through passages and ports 103, 102, 97, 100, 99 to groove 96. Groove 96 is connected by a cross-passage 105 (Fig. 7) with a longitudinal passage 106, having an outlet at 107 (Fig. 6) communicating with the left end of cylinder 108, provided by housing 20. The pressure fluid, therefore, urges a piston 109 connected with rod 53 toward the right. During movement of the piston 109 toward the right into the position shown in Fig. 6, any hydraulic fluid at the right of the piston would be discharged through port 110, annular groove 98, ports 101 through the valve sleeve 95, through the pocket 111 which is connected by passage 112 (Fig. 8) with the chamber 113 (Fig. 6) located in housing 20 and exterior to the cylinder 108.

When valve 92 is moved into the position shown in Fig. 10 by means to be described later, so as to connect ports 100 and 101, pressure fluid flows through port 110 into the right end (Fig. 6) of cylinder 108 and moves the piston 109 toward the left and the hydraulic fluid of the left of the piston 109 flows out of the cylinder 108, through passages 107, 106 and 105 and into annular groove 96 and through ports 99 and into the interior of sleeve 95 and out through the left end of sleeve 95 (Fig. 6) and into the chamber 113. The bottom of chamber 113 is drained through a restricted passage 115 (Fig. 6) leading into a pocket 116 which is connected as shown in Fig. 3 with a drain passage 117 provided at its lower end with screw threads 118 for connection with a drain pipe. The vertical passage 117 leads from a short horizontal passage 119 communicating with the upper portion of the chamber 113. During operation of the controller, while the engine is running, more oil is discharged into the chamber 113 than can be drained by the passage 115 alone, therefore, this oil rises in the chamber 113 to the level of the lower wall of the passage 119 (Fig. 6), thereby substantially filling the chamber 113 with hydraulic fluid.

The left end of cylinder 108 is closed by plug 120 urged by a spring 121 against the plate 24 which provides the passages 115, 116, 117, 118 and 119. The spring 121 serves to move the piston 109 into the position shown in case of failure of oil pressure. Plug 120 provides a tubular bearing 122 for supporting the piston rod 53 which, when moved to the extreme left position, is received by the pocket 116. Any leakage of pressure fluid through the part 122 of the plug 120 is drained through pocket 116 and into passage 117 (Fig. 3). To the right of piston 109, the rod 53 passes through a bushing 125 supported by a plug 126 extending into a hole in the plate 27 and through an oil seal member 127 supported by the plug 126. Any hydraulic fluid that would leak past the bushing 125 is caught by the oil seat 127 and the excess is drained through a vertical drain passage 128 leading to a horizontal drain passage 129 (Fig. 8) connected with the drain passage 117 (Fig. 3).

A spring 130 is located in the pocket 111 (Fig. 6) for the purpose of urging the flanged head 131 of sleeve 95 against the shoulder 132 provided by housing 20.

The fulcrum pin 88 of lever 84 is supported by bridge members 140 (Fig. 8) integral with plates 141 and 142 connected respectively with flexible metal bellows 143 and 144 which are connected, respectively at their outer ends with plates 145 and 146. The space bounded by plates 141 and 145 and the bellows 143 is hermetically sealed and is evacuated so that these members provide an aneroid which compensates for any effect on bellows 144 due to change in atmospheric pressure. Since the bellows 144 is to be responsive to engine fuel intake pressure, the controller provides passages leading into the interior of the bellows 144. These passages include the horizontal passage 150 having a threaded end 151 (Fig. 3) for connection with a pipe (not shown) which is connected with the engine intake. Horizontal passage 150 is connected by vertically inclined passage 152 (Fig. 7) with a pocket 153 in housing 20. Pocket 153 opens into the space within the plate 146 and communicates with the interior of bellows 144 through a hole in a plate 154 serving as a retainer for a spring 156 bearing also against the plate 142. Screws 157 secure plate 146 and a gasket 155 to the housing 20. Springs 158 and 159 are located within the bellows 143 and are confined between the plates 141 and 145. The springs 156, 158 and 159 are so interrelated and calibrated that the movements of pivot pin 88 bear a substantially linear relation to the changes in fuel intake pressure. An adjustment can be made by changing the position of the plate 145 relative to the fixed plate 146. Fig. 6 shows that the plate 145 is located against a tubular plug 160 threaded into the tubular boss 161 of plate 24. Plug 160 is retained in position by a lock nut 162. Screw 163 which retains a lock nut cover 164, passes through a plain hole in plug 160 and is screw threadedly received by the plate 145. To change the position of plate 145 relative to plate 146, screw 163 is removed and the cover 164 is removed to provide access to the nut 162 which is loosened so as to permit turning of the plug 160 by the screw driver slots 166 therein. The plug 160 is turned in or out according to the adjustment to be made; and the lock nut 162 is tightened to secure the plug 160 in the desired position. The screw 163 and lock nut cover 164 are replaced and the screw 163 is tightened so as to urge the plate 145 against the inner end of the plug 160.

Access to the upper portion of chamber 113 in housing 20 is provided through an opening 170 (Fig. 8) closed by plug 171.

The operation of the controller is as follows: Normally the parts of the controller occupy the position shown in Fig. 9, and the throttle valve 41 is in idle position shown at approximately 18 degrees from horizontal. The main control lever 31 is moved from the position in Fig. 9 to that shown in Fig. 10, thereby causing arm 32 to move clockwise to the position in Fig. 10 and likewise the pivot 33 of the floating bell crank lever whose arm 34 is caused to move counterclockwise around pivot 33, while the arm 35 is pivoted around the roller 46 whose axis remains stationary. Through link 37 diagrammatically illustrated in Figs. 9 and 10, this counterclockwise movement of lever arm 34 causes throttle operating lever 39 to move counterclockwise from the position shown in Fig. 9 to that shown in Fig. 10, thereby causing a counterclockwise rotation of shaft 40 and 57° movement of throttle valve 41 from the idle position shown in Fig. 9. In the illustrated embodiment of the invention, the main control lever 31 has been rotated manually its maximum distance, therefore the movement of valve 41 between the position shown in Figs. 9 and 10 is the maximum movement of the valve which can be operated by manual operation. If the main control lever is moved a lesser amount, the valve 41 will be moved manually a lesser amount.

Figure 10:
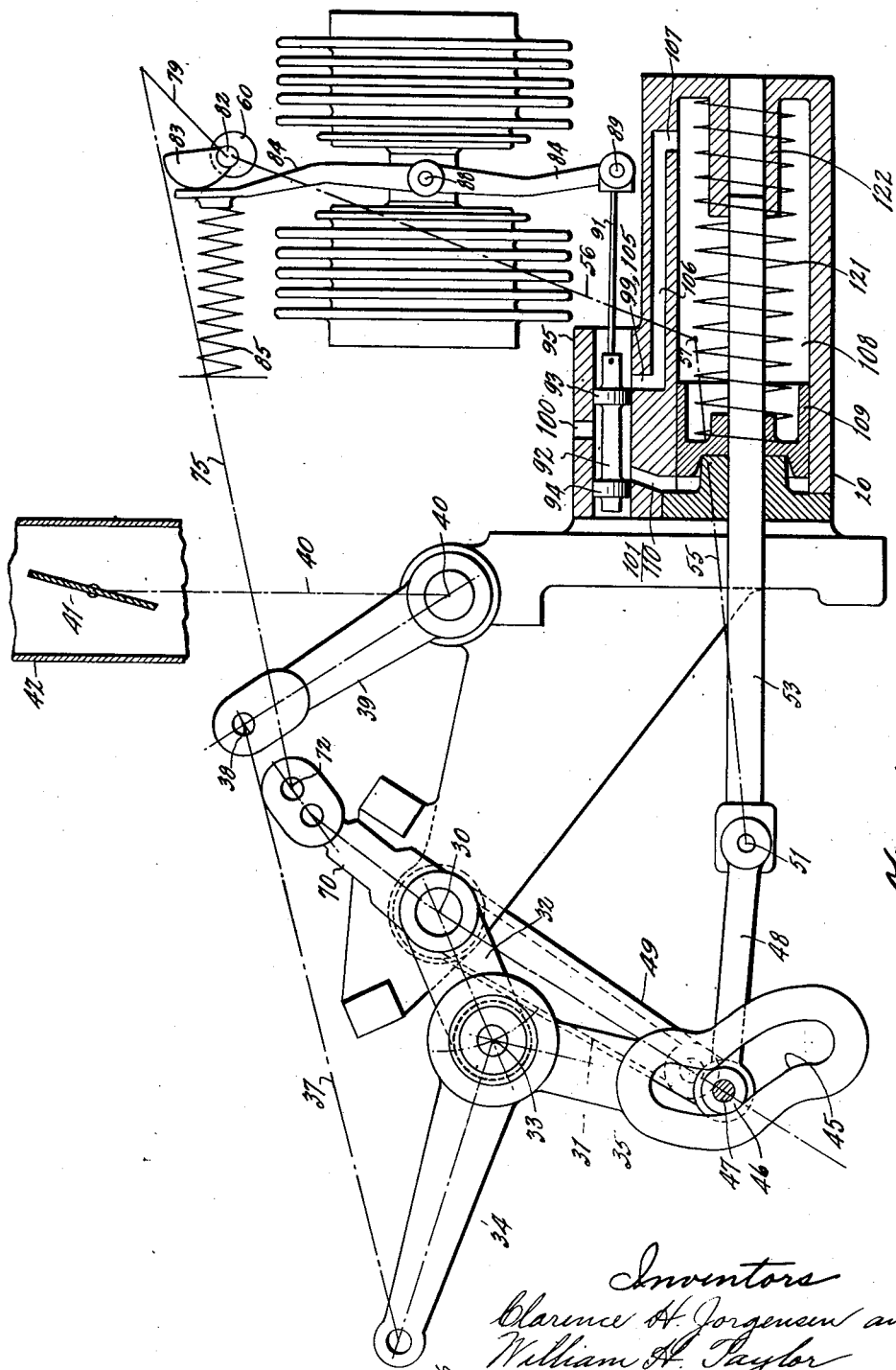
Fig. 10 is a view similar to Fig. 9 showing the condition of the controller after the throttle valve has been opened manually to a certain extent.
Figure 11:
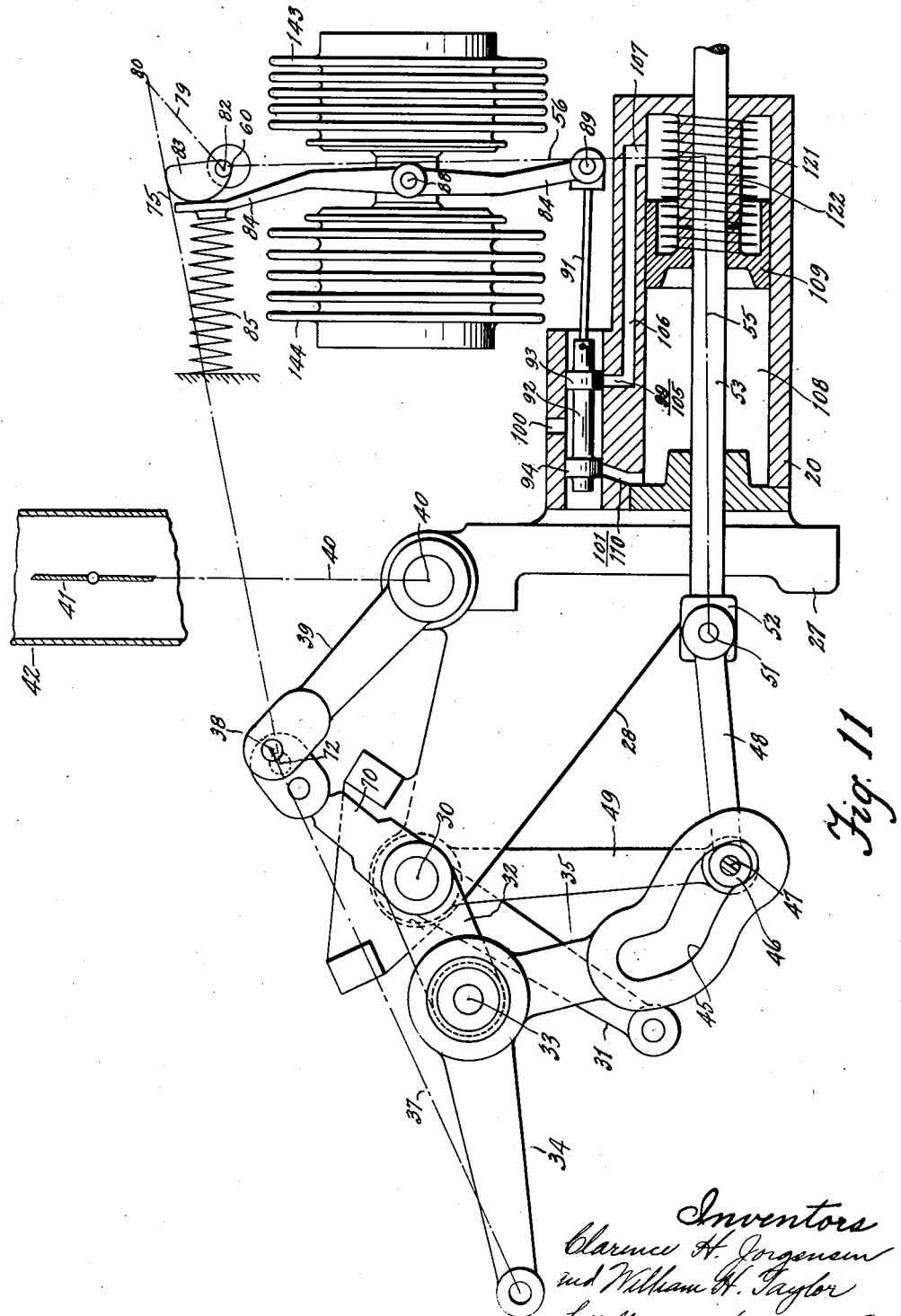
Fig. 11 is a view similar to Fig. 10 showing the condition of the controller after moving the throttle automatically to substantially full open position from the position from which the throttle was manually operated.

Movement of the main control lever 31 into the position shown in Fig. 10 causes a movement of lever arm 70 from the position shown in Fig. 9 to that shown in Fig. 10, thereby causing through the intermediate link 75, lever arm 79 and cam shaft 82, a movement of the pressure selector cam 83 from the position shown in Fig. 9 to that shown in Fig. 10, thereby permitting the spring 85 to move the lever 84 clockwise from the position shown in Fig. 9 to that shown in Fig. 10, thereby causing valve 92 to move left from the position shown in Fig. 9 to that shown in Fig. 10, thereby placing port 100 in communication with port 101, thereby causing pressure fluid to flow into the left end of the cylinder 108, as shown in Fig. 10, or at the right end of the cylinder, as shown in Fig. 6. This causes the piston 109 and the piston rod 53 and the cross head pin or stud 51 and the link 48 and the screw stud 47 and the roller 46 to move from the position shown in Fig. 10 toward the right toward the position shown in Fig. 11. During this movement, the roller 46 moves in an arc about the axis of shaft 30, the radius being determined by the arm 49, and it cooperates with the cam slot 45 of lever arm 35 to move said arm 35 from the position shown in Fig. 10 toward that shown in Fig. 11, thereby causing through arm 34, link 37, arm 39 and shaft 40, a further movement of valve 41 toward the position of maximum opening shown in Fig. 11, which is required when critical altitude is reached.

Before critical altitude is reached, the stroke of the piston 109 is less than the maximum, and is that amount of stroke required to give such throttle opening, in addition to manually effected throttle opening as to cause the selected pressure to be maintained. The selected pressure having been attained through additional throttle opening, the bellows 144 expands and causes valve 92 to close ports 101 and 99 and movement of the piston 109 ceases. As altitude increases, piston 109 progressively moves toward the right (Figs. 9, 10, 11), and arrives at the position shown in Fig. 11 when critical altitude is reached.

In the illustrated embodiment of the controller, it was stated that the valve 41 was moved manually a maximum distance of 57° from idle position. At critical altitude, the servo-motor will have moved the valve automatically 15 additional degrees so that the total throttle movement of the valve is 72° in the illustrated embodiment. If the manual movement of the valve 41 had been less than 57°, the automatic movement performed by the piston 109 would have been greater than 15°. This is possible because less manual movement of pivot 33 from the position shown in Fig. 9 places said pivot closer to the roller 46, therefore, the servo-motor will give a greater angular movement to the arm 35. The relation between manually effected and automatically effected movements of the valve 41 is determined by the location of the pivot 33 relative to the roller 46 and by the shape of the cam slot 45.

Figure 12:
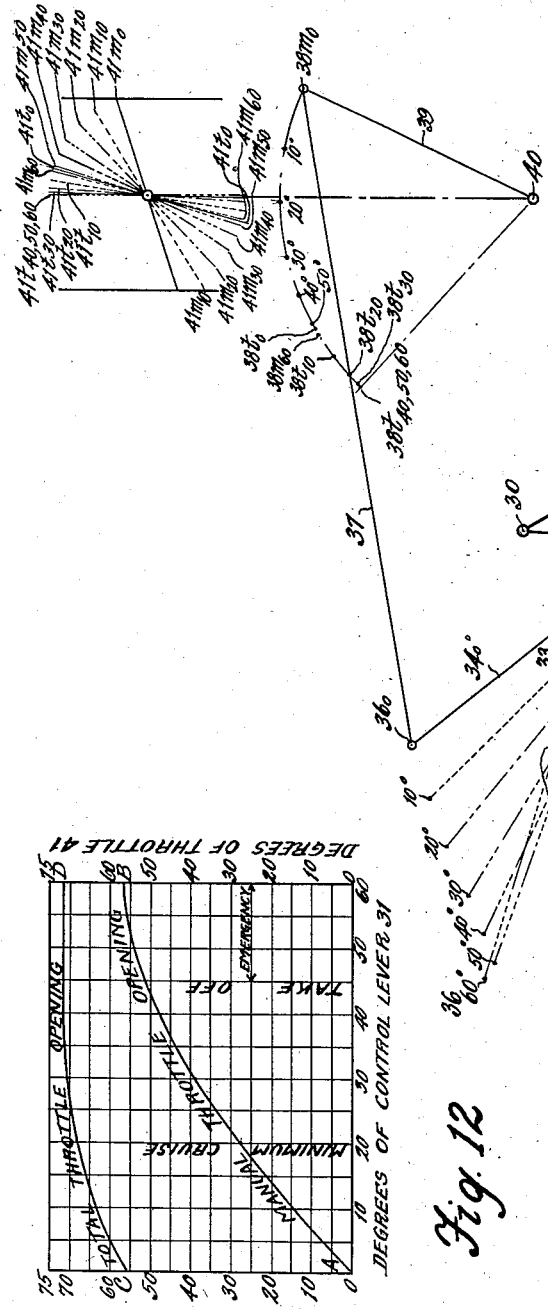
Fig. 12 is a chart showing the relation of throttle opening to movement of the control lever of the regulator.

Fig. 12 shows the relation of degrees of throttle opening to degrees of movement of the main control lever 31. Curve AB shows the degrees of throttle opening effected manually when the lever 31 is moved between 0° and 60°. Curve CD shows the total opening movements of the throttle obtained by manual movement plus the automatic movement effected by the servo-motor at critical altitude as the result of pressure selections made by movements of lever 31 between 0° and 60°. The throttle remains substantially at the position of maximum opening throughout a range of selection of pressure from high values required for take-off and emergency (45°–60° positions of lever 31) to lower values specified for cruising (45°–20° positions of lever 31). In fact, when lever 31 is at its 20° position to give a pressure selection required for minimum cruising, the throttle opening at critical altitude is about 68° which is only 4° below maximum.

Figure 13:
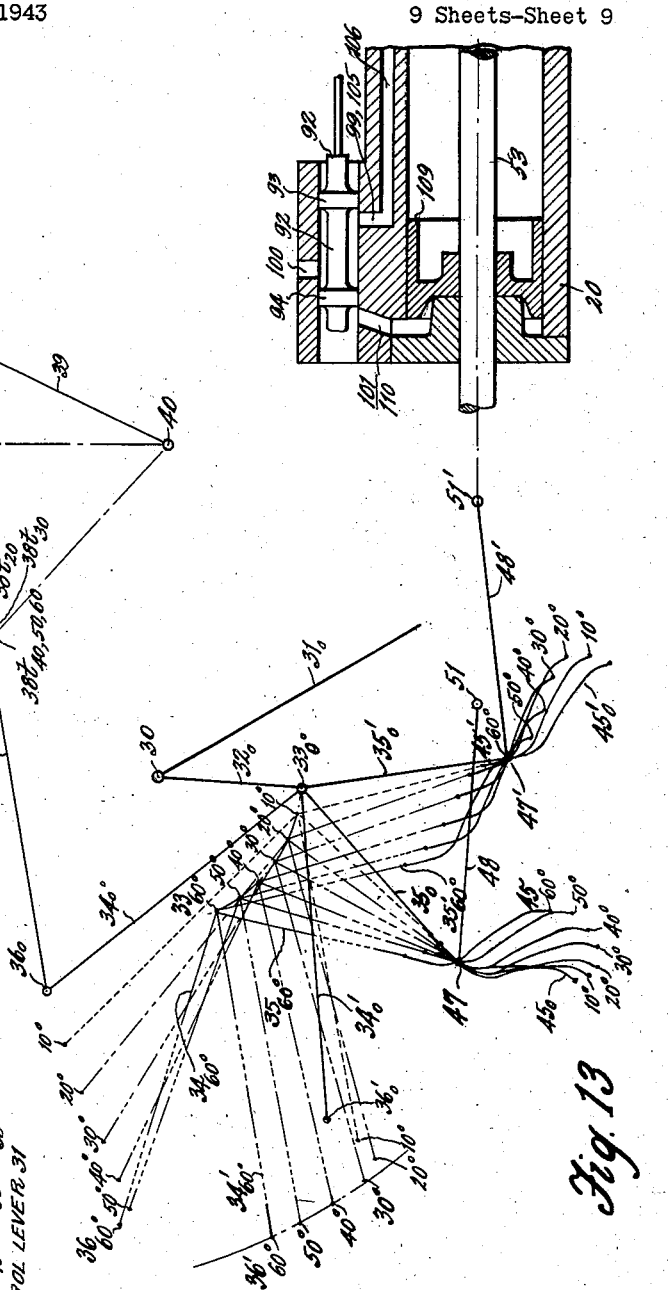
Fig. 13 is a diagram of movements of various parts.

Fig. 13 shows the positions of throttle valve 41 and its operating mechanism corresponding to the positions of lever 31, 0°, 10°, 20°, 30°, 40°, 50° 60° and corresponding to extreme left and extreme right position of piston 53. Pivot 33 has positions 33$_0$ to 33$_{60}$. With piston 109 in extreme left position, and the axis of roller 46 at 47, arm 35 has positions 35$_0$ to 35$_{60}$, arm 34 has positions 34$_0$ to 34$_{60}$, pin 36 has positions 36$_0$ to 36$_{60}$, lever 39 has positions 38$m_0$ to 38$m_{60}$ and valve 41 has positions 41$m_0$ to 41$m_{60}$ meaning the various manually effected locations of valve 41 corresponding 10° movements of lever 31. The relation of movements of lever 31 and corresponding movements of valve 41 is shown by curve A—B in Fig. 12. When the piston 109 moves to the extreme right position, pin 51 moves to 51′ and the axis 47 of roller 46 moves to 47′. The various positions of arm 35 are 35′$_0$ to 35′$_{60}$, the various positions of arm 34 are 34′$_0$ to 34′$_{60}$, the various positions of pin 36 are 36′$_0$ to 36′$_{60}$, the various positions of pin 38 are 38$t_{40, 50, 60}$ and the various positions of valve 41 are 41$t_0$ to 41$t_{40, 50, 60}$ which are the positions represented by curve CD of Fig. 12. In each of its initial positions corresponding to the extreme left position of piston 109, cam slot 45 has center line positions 45$_0$ to 45$_{60}$, each of which pass through the axis 47. In each of its final positions corresponding to the extreme right position of piston 109 (the critical altitude position), cam slot 45 has center line positions 45′$_0$ to 45′$_{60}$, each of which pass through the axis of roller 46 when at 47′. Cam slot center line 45 is correct when these conditions are satisfied. The relation of parts 39, 37, 34, 35, 33, and 30 is such as to obtain an approximation of the required throttle opening indicated in Fig. 12; and cam slot 45 is so shaped to act as a vernier to give exactly the required throttle opening. It is desirable to bring the throttle to wide open throttle at critical altitude over a wide range of pressure selections made by moving lever 31, but there must be no tendency to move the throttle past wide open position because, since the carburetor has a stop preventing movement of the throttle past wide open position, any effort made by the regulator toward over-travel of the throttle would cause a backward shifting of the control lever 31; and with it the pilot's control lever. This would cause a selection of a pressure less than the required pressure previously set by the pilot.

Various combinations of manual and automatic movements of the throttle can be effected chiefly by changing the angular relation between the main control lever 31 and the arm 32 and by substituting for the floating bell crank lever shown, other floating bell crank levers differing in the angular relation between the arms 34 and 35, or differing in the shape of the cam slot 45 or differing with respect to both. Hence it is possible, with the minimum number of changes, to adapt the present controller to the requirements of different makes of engines varying in their requirements with respect to the relations between manual throttle control and automatic throttle control. In the majority of cases, the requirements of the geometry of the mechanical movements can be satisfied by the correct shape of the cam slot 45. The slot 45 can be so shaped that, regardless of the amount of throttle opening obtainable manually for various pressure selections, the full-stroke movement of the servo-motor at critical altitude will give enough additional opening movement of the throttle valve to bring it to wide open position although the pressure selections obtained by various movements of the main control lever 31 may vary from highest pressure required for emergency operation down to lower pressures specified for cruising.

The lever 31 can be attached to the shaft 30 in different positions of angular arrangement and the shaft 30 may extend in either direction from its support so that the lever 31 may be attached at either end of shaft 30 as desired. The throttle operating shaft 40 may not be connected directly with the throttle valve 41 as shown in Fig. 9, but may be connected through an intermediate arm 200 (Fig. 5) which can be connected on one end of the shaft 40, as shown, or on the other end and be connected with a link, not shown, extending to the throttle operating lever of the carburetor.

The engine intake pressure which is selected to be maintained at ground level by moving the lever 31 to a certain position is gradually reduced automatically as the altitude increases. At critical altitude, this reduction amounts to a few per cent of the pressure selected by the lever 31. This reduction is commensurate with the reduction in the engine exhaust back pressure as altitude increases. Therefore, the engine power output to the propeller will remain substantially constant with altitude variations. This reduction in the manually selected pressure takes place as the axis of shaft 82, carrying the pressure selecting cam 83 (Fig. 11), moves counterclockwise around the axis of shaft 60, when the shaft 60 is rotated counterclockwise during movement of piston 109 toward the right, the piston 109 being connected with shaft 60 through piston rod 53, pin 51, link 55 and lever 56. This feature is described and claimed in the copending Dolza et al. application referred to.

While the embodiment of the present invention as herein disclosed, constitutes a preferred form, it is to be understood that other forms might be adopted, all coming within the scope of the claims which follow.

What is claimed is as follows:

1. A throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressure obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, and a mechanism operated by the servo-motor member for operating the throttle and including means for transmitting from the movement of the servo-motor member that movement which is required to bring the throttle substantially to wide open position throughout the major portion of the range of pressure selections required during flight.

2. A throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressures obtainable by opening the throttle manually being less than the selected pressures, means under control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, and a mechanism operated by the control lever and by the servo-motor member for operating the throttle and including means initially set by the control lever for transmitting from the movement of the servo-motor member that movement which is required to bring the throttle substantially to wide open position throughout the major portion of the range of pressure selections required during flight.

3. A throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressures obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, a differential lever connected with the throttle and having a floating fulcrum positioned by the control lever, and means initially set by the positioning of the fulcrum of the differential lever for transmitting from the movement of the servo-motor member that movement which is required to bring the throttle substantially to wide-open position throughout the major portion of the range of pressure selections required during flight.

4. A throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressures obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, a differential bell-crank lever having one arm connected with the throttle and having a floating fulcrum positioned by the control lever, and a cam and a cam follower associated with the other arm of the bell-crank lever for transmitting from the movement of the servo-motor member that movement which is required to bring the throttle substantially to wide open position throughout the major portion of the range of pressure selections required during flight, the initial relation of the cam and follower being determined by the location of the fulcrum of the bell-crank lever.

5. A throttle valve controller for supercharged internal combustion engines for aircraft, a servo-motor having a movable operating member, a variably positioned device for selecting the intake pressure to be maintained, a main control lever for operating the pressure selector and for imparting to the throttle valve an increasing opening movement as the pressure selection increases, the pressures obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, a differential bell-crank lever having one arm connected with the throttle and having a floating fulcrum positioned by the control lever, a cam provided by the other arm of the bell-crank lever and a cam follower connected with the servo-motor member for transmitting from the movement of the servo-motor member that movement which is required to bring the throttle substantially to wide-open position throughout the major portion of the range of pressure selections required during flight, the initial relation of the cam and follower being determined by the location of the fulcrum of the bell-crank lever.

6. A throttle valve controller for supercharged internal combustion engines for aircraft, a servomotor having a movable operating member, a variably positioned device for selecting the intake pressure to be maintained, a main control lever for operating the pressure selector and for imparting to the throttle valve an increasing opening movement as the pressure selection increases, the pressure obtainable by opening the throttle manually being less than the selected pressures, means under the control of the pressure selecting device and responsive to engine intake pressure for determining the travel of the servo-motor member necessary to locate the throttle in that position of opening required to maintain the selected pressure, the maximum travel of the servo-motor member being in excess of that required to move the throttle wide open when the pressure selections are in the major portion of the range of pressure selections required during flight, a shaft operated by the main control lever, a lever connected with the shaft and with the pressure selecting device, a differential bell-crank lever connected with the throttle and having a floating fulcrum supported by the second-mentioned lever, a cam provided by the other arm of the bell-crank lever and a cam follower supported for orbital movement about the axis of said shaft, and means for connecting the cam follower with the servo-motor member, said cam and follower providing for the transmission from the movement of the servo-motor member that movement which is required to bring the throttle substantially to wide-open position throughout the major portion of the range of pressure selections required during flight, the initial relation of the cam and follower being determined by the location of the fulcrum of the bell-crank lever.

7. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure, automatic means so constructed that it is not directly responsive to changes in altitude pressure and movable in response to changes in manifold pressure to complete the movement of the throttle necessary to obtain the selected pressure, and means whereby the total movement of the throttle valve effected manually and automatically may be such as to bring the throttle valve to wide-open position at critical altitude, throughout a predetermined range of pressures extending from the relatively low pressure necessary for cruising to the relatively high pressure necessary for proper operation of the engine during take-off or emergency operation of the aircraft.

8. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure, a servo-motor operable in response to changes in manifold pressure to complete the movement of the throttle necessary to obtain the selected pressure, and means whereby the total movement of the throttle valve effected manually and automatically may be such as to bring the throttle valve to wide-open position at critical altitude, throughout a predetermined range of pressures extending from the relatively low pressure necessary for cruising to the relatively high pressure necessary for proper operation of the engine during take-off or emergency operation of the aircraft.

9. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure, automatic means so constructed that it is not directly responsive to changes in altitude pressure and movable in response to changes in manifold pressure to complete the movement of the throttle necessary to obtain the selected pressure, means whereby the total movement of the throttle valve effected manually and automatically may be such as to bring the throttle valve to wide-open position at critical altitude, throughout a predetermined range of pressures extending from the relatively low pressure necessary for cruising to the relatively high pressure necessary for proper operation of the engine during take-off or emergency operation of the aircraft and means also actuated by the manual means for selecting a pressure to be maintained.

10. Apparatus for controlling the manifold pressure of a supercharged aircraft engine having an induction throttle valve movable to different positions to control said manifold pressure, comprising manual and automatic means for moving said throttle to different positions, and means for changing the adjustment of the operating connection between the automatic means and the throttle so that the amount of movement of said throttle which can be effected by any given movement of the automatic means may be varied.

11. Apparatus for controlling the manifold pressure of a supercharged aircraft engine having an induction throttle valve movable to different positions to control said manifold pressure, comprising manual and automatic means for moving said throttle to different positions, and means, operated by the manually operable means for moving the throttle, for changing the adjustment of the operating connection between the automatic means and the throttle, so that the amount of movement of said throttle which can be effected by any given movement of said automatic means may be changed as the throttle is moved to different positions by said manual means.

12. Apparatus for controlling the manifold pressure of a supercharged aircraft engine having an induction throttle valve movable to different positions to control said manifold pressure, comprising manual and automatic means for moving said throttle to different positions, means for selecting a pressure to be maintained and means operable as the pressure selecting means is moved to different positions to select high or low pressures for changing the adjustment of the operating connection between the automatic means and the throttle, so that a given movement of the automatic means will effect a different amount of movement of the throttle when a high pressure is selected, from that effected by the same movement of the automatic means when a low pressure is selected.

13. Apparatus for controlling the intake pressure of an aircraft engine having, in combination, a throttle valve movable to different positions to obtain different intake pressures, mechanism for moving the throttle valve to the position necessary to obtain some selected pressure including a manually operable member which is operative to move the throttle part way to the position it must occupy to obtain the desired pressure and automatic means for completing the movement of the throttle to such position, operating connections between said means and the throttle valve, a device for controlling the operation of said automatic means including pressure responsive means operable upon changes in intake pressure to cause movement of the throttle by said automatic means, and means operable during operation of the engine to change the adjustmen of the operating connections between said automatic means and the throttle, so that the amount of movement of the throttle by any given movement of said automatic means may be modified.

14. Apparatus for controlling the intake pressure of an aircraft engine having, in combination, a throttle valve movable to different positions to obtain different intake pressures, mechanism for moving the throttle valve to the position necessary to obtain some selected pressure including a manually operable member which is operative to move the throttle part way to the position it must occupy to obtain the desired pressure and a servomotor for completing the movement of the throttle to such position, operating connections between said servomotor and the throttle valve, a device for controlling the operation of said servomotor including pressure responsive means operable upon changes in intake pressure to cause movement of the throttle by said servomotor, and means operable during operation of the engine to change the adjustment of the operating connections between said servomotor and the throttle, so that the amount of movement of the throttle by any given movement of said servomotor may be modified.

15. Apparatus for controlling the intake pressure of an aircraft engine having, in combination, a throttle valve movable to different positions to obtain different intake pressures, mechanism for moving the throttle valve to the position necessary to obtain some selected pressure including a manually operable member which is operative to move the throttle part way to the position it must occupy to obtain the desired pressure and a hydraulic servomotor for completing the movement of the throttle to such position, operating connections between said hydraulic servomotor and the throttle valve, a device for controlling the operation of said hydraulic servomotor including pressure responsive means operable upon changes in intake pressure to cause movement of the throttle by said hydraulic sehvomotor, and means operable during operation of the engine to change the adjustment of the operating connections between said hydraulic servomotor and the throttle, so that the amount of movement of the throttle by any given movement of said hydraulic servomotor may be modified.

16. Apparatus for controlling the intake pressure of an aircraft engine having, in combination, a throttle valve movable to different positions to obtain different intake pressures, mechanism for moving the throttle valve to the position necessary to obtain some selected pressure including a manually operable member which is operative to move the throttle part way to the position it must occupy to obtain the desired pressure and automatic means for completing the movement of the throttle to such position, operating connections between said means and the throttle valve, a device for controlling the operation of said automatic means including pressure responsive means operable upon changes in intake pressure to cause movement of the throttle by said automatic means, means operable during operation of the engine to change the adjustment of the operating connections between said automatic means and the throttle, so that the amount of movement of the throttle by any given movement of said automatic means may be modified, and means whereby said manually operable member operates the means for changing the adjustment of said operating connections.

17. Apparatus for controlling the induction pressure of an aircraft engine having, in combination, a throttle valve movable to different positions to variably regulate the induction pressure, means for moving said throttle valve, operating connections between said means and the throttle valve, a device for controlling the operation of said means including coaxial and expansible pressure responsive elements for controlling the operation of said means so that the throttle is moved upon changes in induction pressure and means adjustable during operation of the engine for changing the adjustment of the operating connections between said means and the throttle, so that the amount of movement of the throttle effected by any given movement of said means may be modified.

18. Apparatus for controlling the induction pressure of an aircraft engine having, in combination, a throttle valve movable to different positions to variably regulate the induction pressure, a servomotor for moving said throttle valve, operating connections between the servomotor and the throttle valve, a device for controlling the operation of said servomotor including coaxial and expansible pressure responsive elements for controlling the operation of said servomotor so that the throttle is moved upon changes in induction pressure and means adjustable during operation of the engine for changing the adjustment of the operating connections between said servomotor and the throttle, so that the amount of movement of the throttle effected by any given movement of said servomotor may be modified.

19. Apparatus for controlling the induction pressure of an aircraft engine having, in combination, a throttle valve movable to different positions to variably regulate the induction pressure, a hydraulic servomotor for moving said throttle valve, operating connections between the servomotor and the throttle valve, a control valve for regulating the action of said servomotor, pressure responsive elements operatively connected to said control valve and so constructed as to be responsive to changes in induction pressure and effective to move said valve to cause operation of the servomotor upon such changes in pressure, operating connections between said servomotor and said throttle valve, and means adjustable during operation of the engine to modify the action of said operating connections whereby any given movement of the servomotor may effect movements of the throttle valve of different magnitude as determined by the position of said adjustable means.

20. Apparatus for controlling the induction pressure of an aircraft engine having, in combination, a throttle valve movable to different positions to variably regulate the induction pressure, a hydraulic servomotor for moving said throttle valve, operating connections between the servomotor and the throttle valve, a control valve for regulating the action of said servomotor, pressure responsive elements operatively connected to said control valve and so constructed as to be responsive to changes in induction pressure and effective to move said valve to cause operation of the servomotor upon such changes in pressure, operating connections between said servomotor and said throttle valve, and means adjustable during operation of the engine to modify the action of said operating connections whereby any given movement of the servomotor may effect movements of the throttle valve of different magnitude as determined by the position of said adjustable means, said adjustable means being also effective to move said valve to cause operation of the servomotor independently of any change in atmospheric or induction pressure.

21. Apparatus for controlling the induction pressure of an aircraft engine having, in combination, a throttle valve movable to different positions to variably regulate the induction pressure, a hydraulic servomotor for moving said throttle valve, operating connections between the servomotor and the throttle valve, a control valve for regulating the action of said servomotor, pressure responsive elements operatively connected to said control valve and so constructed as to be responsive to changes in induction pressure and effective to move said valve to cause operation of the servomotor upon such changes in pressure, operating connections between said servomotor and said throttle valve, a lever adjustable during operation of the engine to modify the effective action of said operating connections whereby any given movement of the servomotor may effect movements of said throttle valve of different magnitude as determined by the position of said lever, said lever being also connected to said control valve so that adjustment of said lever will move said valve and cause operation of said servomotor independently of any change in either atmospheric or induction pressure.

22. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure, automatic means compensated for altitude change and movable in response to changes in manifold pressure to complete the movement of the throttle necessary to obtain the selected pressure, and means whereby the total movement of the throttle valve effected manually and automatically may be such as to bring the throttle valve to wide open position at critical altitude, throughout a predetermined range of pressures extending from the relatively low pressure necessary for cruising to the relatively high pressure necessary for take-off or emergency operation of the aircraft, said last named means being so constructed that the manually produced movement of the throttle to open position varies in accordance with the amount of pressure selected while the automatically produced movement of the throttle varies inversely with respect to the amount of pressure selected.

23. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure, a servo-motor operable in response to changes in manifold pressure to complete the movement of the throttle necessary to obtain the selected pressure, and means whereby the total movement of the throttle valve effected manually and automatically may be such as to bring the throttle valve to wide open position at critical altitude, throughout a predetermined range of pressures extending from the relatively low pressure necessary for cruising to the relatively high pressure necessary for take-off or emergency operation of the aircraft, said last named means being so constructed that the manually produced movement of the throttle to open position varies in accordance with the amount of pressure selected, while the automatically produced movement of the throttle varies inversely with respect to the amount of pressure selected.

24. Apparatus for controlling the manifold pressure of a supercharged aircraft engine comprising means for selecting different manifold pressures to be maintained, an induction throttle valve which is movable to different positions to obtain the different pressures selected, manually operable means for moving the throttle through part of the distance necessary to obtain a selected pressure and means operated thereby for selecting a pressure to be obtained, automatic means compensated for altitude change and movable in response to changes in manifold pressure to complete the movement of the throttle necessary to obtain the selected pressure, means whereby the total movement of the throttle valve effected manually and automatically may be such as to bring the throttle valve to wide open position at critical altitude, throughout a predetermined range of pressures extending from the relatively low pressure necessary for cruising to the relatively high pressure necessary for take off or emergency operation of the aircraft, said last named means being so constructed that the manually produced movement of the throttle to open position varies in accordance with the amount of pressure selected, while the automatically produced movement of the throttle varies inversely with respect to the amount of pressure selected.

CLARENCE H. JORGENSEN.
WILLIAM H. TAYLOR.

REFERENCES CITED

The following references are of record in the file of this patent:

UNITED STATES PATENTS

| Number | Name | Date |
| --- | --- | --- |
| 2,024,202 | Berger | Dec. 17, 1935 |
| 2,217,364 | Halford et al. | Oct. 8, 1940 |
| 2,243,627 | Gregg | May 27, 1941 |
| 2,282,529 | Pierce | May 12, 1942 |
| 2,358,363 | Truesdell | Sept. 19, 1944 |
| 2,403,398 | Reggio | July 2, 1946 |
| 2,453,651 | Mock | Nov. 9, 1948 |